United States Patent [19]
Salatiello et al.

[11] Patent Number: 4,729,862

[45] Date of Patent: * Mar. 8, 1988

[54] NYLON COMPOSITION FOR USE IN ROTATIONAL MOLDING

[75] Inventors: Peter P. Salatiello, Morris Plains; Frank Petrucelli, Boonton; Paul W. Flood, Lake Hopatcong, all of N.J.

[73] Assignee: Allied-Signal Inc., Morris Township, Morris County, N.J.

[*] Notice: The portion of the term of this patent subsequent to Apr. 2, 2002 has been disclaimed.

[21] Appl. No.: 867,903

[22] Filed: May 20, 1986

Related U.S. Application Data

[60] Continuation of Ser. No. 684,327, Dec. 20, 1984, abandoned, which is a continuation of Ser. No. 464,836, Feb. 8, 1983, Pat. No. 4,508,675, which is a division of Ser. No. 256,887, Apr. 24, 1981, abandoned.

[51] Int. Cl.$^4$ .................................................. B29C 5/04
[52] U.S. Cl. ........................................ 264/310; 264/85; 264/311; 524/413; 524/398
[58] Field of Search ............... 264/310, 311, 85, 141; 524/434, 413, 398

[56] References Cited

U.S. PATENT DOCUMENTS 4,172,069  10/1979  Cordes et al. .................. 524/413
4,508,675  2/1985  Saletiello ........................ 264/310

FOREIGN PATENT DOCUMENTS 908647  10/1962  United Kingdom .

OTHER PUBLICATIONS

Modern Plastics Encyclopedia, 1979–1980, vol. 56, No. 10A, p. 381.

*Primary Examiner*—James Derrington
*Attorney, Agent, or Firm*—Richard A. Negin; Patrick L. Henry

[57] ABSTRACT

A rotational moldable polyamide composition, a method of preparing the composition, and a method of rotational molding. The composition contains from about 0.001 percent to about 0.5 percent by weight of a copper compound, preferably cuprous iodide. Preferably, the composition contains from about 0.001 percent to about 0.3 percent by weight of potassium iodide.

12 Claims, No Drawings

NYLON COMPOSITION FOR USE IN ROTATIONAL MOLDING

This application is a continuation, of Ser. No. 684,327, filed on Dec. 20, 1984, now abandoned, which is a continuation of application Ser. No. 464,836, filed on Feb. 8, 1983, now U.S. Pat. No. 4,508,675, which is a divisional of Ser. No. 256,887 filed on Apr. 24, 1981, now abandoned.

BACKGROUND OF THE INVENTION

This invention is the field of polyamide compositions; more particularly, the invention relates to a polyamide composition for use in rotational molding and a method for preparing the rotational moldable composition.

Rotational molding, also known as rotomolding, is used in the manufacture of hollow objects from thermoplastics. In the basic process of rotational molding, solid or liquid polymers are placed in a mold. The mold is first heated and then cooled while being rotated about two perpendicular axes simultaneously. Many polymers can be used in the rotational molding process. Popular polymers for this use are polyolefins such as polyethylene. It is also known to use polycarbonates, crosslinkable polyethylene, nylon, and other materials. In selecting the rotational molding grade formulation, care must be taken to assure that there will not be thermal degradation during the heating cycle. A general discussion on rotational molding is given in MODERN PLASTICS ENCYCLOPEDIA 1979-1980, Volume 56, No. 10A, beginning at Page 381.

Nylon formulations containing metal halide materials such as cuprous iodide and cuprous iodide plus potassium iodide are well known in the art as evidenced by Great Britain Pat. No. 908,647. Since that time, cuprous iodide had been widely used for thermostabilization of polyamide compounds.

SUMMARY OF THE INVENTION

This invention relates to a heat stabilized polyamide composition which has been found particularly useful for rotational molding, a method of preparing the composition, and the method of rotational molding using this composition. The heat stabilized polyamide composition comprises a polyamide, and about 0.001 to about 0.5 percent by weight of the polyamide of a copper compound, preferably cuprous iodide. Preferably, there is from about 0.001 percent to about 0.3 percent by weight of the polyamide of potassium iodide.

A preferred composition comprises polyepsiloncaprolactam having more chain ends terminated by a carboxylic acid group than by an amine group, and between about 0.01 and about 0.05 percent by weight of the polyamide of cuprous iodide, and from about 0.01 percent to about 0.10 percent, based on the weight of the polyamide, of potassium iodide.

The present invention includes a method for preparing the rotational moldable composition. The polyamide and from about 0.001 percent to about 0.5 percent by weight of the polyamide of a copper compound, preferably cuprous iodide, are physically mixed. This mixture is melt blended, preferably extruded, at a temperature above the polymer melting point and less than about 282° C. (540° F.). The melt blended mixture, preferably in pellet form, can be used to rotationally mold an article. The composition preferably contains from about 0.001 percent to about 0.3 percent potassium iodide which can be added to the polyamide prior to the addition of the copper compound or physically mixed and melt blended in the same manner as the copper compound.

The method of rotational molding of the present invention comprises rotationally molding a polyamide article made from a composition comprising a polyamide, preferably having more chain ends terminated by a carboxylic acid group than by an amine group, and from about 0.001 percent to about 0.5 percent by weight of the total polyamide of a copper compound, preferably cuprous iodide. Preferably, there is from about 0.001 percent to about 0.3 percent, based on the weight of the polyamide, of potassium iodide. The polyamide is fed into the mold and the composition heated. The mold is rotated followed by cooling after which the article is removed.

Objects, features and advantages of the present invention will become apparent by reference to the following specification.

DESCRIPTION OF THE PREFERRED EMBODIMENTS

The present invention is a heat stabilized polyamide composition particularly useful in rotational molding, a method of preparing the composition, and the method of rotational molding using this composition. The composition comprises a polyamide, preferably having more chain ends terminated by a carboxylic acid group than by an amine group, and from about 0.001 percent to about 0.5 percent by weight of the polyamide of a copper compound, preferably cuprous iodide. In a preferred composition, the amount of cuprous iodide is between about 0.010 percent and about 0.050 percent by weight of the polyamide, and in the most preferred composition, there is between about 0.015 percent and about 0.025 percent, by weight of the polyamide, of cuprous iodide. Preferably, there is from about 0.001 percent to about 0.3 percent and more preferably, from about 0.01 percent to about 0.1 percent, based on the weight of the polyamide, of potassium iodide.

The term "polyamide" used in the practice of the present invention is intended to include long chain synthetic polymers which have regularly recurring amide groups as an integral part of the main polymer chain; and hence, include amide-ester copolymers. Suitable polyamides can be prepared by polymerization of a difunctional monomer or equivalently, its cyclized lactam (e.g., epsilon-aminocaproic acid or caprolactam, respectively) or by the reaction of a conjugate pair of monomers, for example, a diamide and a dicarboxylic acid (e.g., hexamethylenediamine and adipic acid), or a linear aminoaliphatic acid such as ω-amino undecanoic acid.

Suitable polylactams can be produced by the polymerization of lactam monomers of the formula

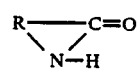

where R is an alkylene group having from 3 to 12 or more carbon atoms, preferably from 5 to 12 carbon atoms. A preferred monomer is epsiloncaprolactam having 5 carbon atoms in the alkylene group. Lactam monomers in addition to epsiloncaprolactam include pyrollidone, piperodone, valerolactam, caprylactam, lauryl lactam, etc. Also included are copolymers of two or more of the above or similar lactam monomers. Suitable diamines useful in the polymerization of polyamides include propanediamine, hexamethylenediamine, octamethylenediamine, etc. Suitable polycarboxylic acids include acids such as adipic acid, pimelic, suberic, sebacic, dodecaneoic, etc. Also included are copolymers or blends of polyamides of the above categories.

Typically, the number average molecular weight of these polymers is between about 10,000 and about 50,000, preferably 15,000 to 40,000 and more preferably 20,000 to 30,000. This is because mechanical properties improve rapidly until about 20,000, and processing starts to become more difficult above 30,000.

Polyepsiloncaprolactam is the preferred polyamide for use in the present invention. Polyepsiloncaprolactam suitable for use herein can contain a variety of terminal functionality. Preferred terminal functionality is that containing:

(a) A carboxyl group attached to both ends of the polyamide chain;
(b) A carboxyl group attached to one end and an acetamide group attached to the other end of the polyamide chain;
(c) An amine group attached to both ends of the polyamide chain; and
(d) A carboxyl group attached to one end and an amino group attached to the other end of the polyamide chain.

It is preferred that the polyepsiloncaprolactam have more chain ends terminated by acid groups than by amine groups. During the polymerization to form polyepsiloncaprolactam, a controlled amount of azelaic acid results in a predetermined excess of polycaprolactam chain ends terminated by acid groups. Preferably, there are from 50 percent to 90 percent, and more preferably from 60 percent to 80 percent, of the end groups acid terminated. Preferably, the end groups are terminated with a dicarboxylic acid, such as azelaic acid. When this is the case, the composition can be rotationally molded in the presence of oxygen. However, it is preferred to use an inert, oxygen-free atmosphere, such as nitrogen or carbon dioxide, to prevent oxidation even where there is excess end groups terminated with carboxyl groups. If there are not more polyepsiloncaprolactam chain ends terminated with acid groups than with amine groups, an inert atmosphere is required for a satisfactory product with the polyepsiloncaprolactam stabilized with cuprous iodide. Otherwise, the composition is susceptible to oxidation resulting in loss of color and physical properties.

Polyamides other than polyepsiloncaprolactam can be used, but polyepsiloncaprolactam is preferred. For example, polyhexamethylene adipamide has a higher melting temperature and flows with more difficulty than polyepsiloncaprolactam. The polyepsiloncaprolactam provides a lower melting, easier processing product wherein the pellets of material flow or knit more readily into each other.

The use of copper compounds with polyepsilon caprolactam results in a rotational molded article having improved impact properties. It is believed that the interaction of the copper cation with the polymer reduces crystallinity in the final product resulting in improved impact resistance properties.

The copper compound can be an organic or inorganic copper salt with the copper in cupric or cuprous form. A preferred organic salt is cupric acetate. Preferred inorganic salts are copper halides, including cuprous iodide, and cupric and cuprous chloride. The most preferred copper salt is cuprous iodide. The copper compound reduces crystallinity resulting in high impact properties. Additionally, the above listed preferred copper compounds provide heat stabilization. There is from about 0.001 percent to about 0.5 percent by weight, or preferably from about 0.01 to about 0.05 percent by weight of the copper compound, preferably cuprous iodide.

The polyepsiloncaprolactam composition of this invention does not require the use of a plasticizer for successful rotational molding, although caprolactam can be used as a plasticizer. A small amount of plasticizer, such as caprolactam monomer, can deposit on the mold and must be washed off.

When polyepsiloncaprolactam is polymerized, about 8 percent to about 12 percent of the caprolactam monomer remains. This monomer can be left in the "unwashed" polyepsiloncaprolactam to act as a plasticizer, or it can be washed away with water. The "washed" polycaprolactam contains only about 1 percent to 2 percent of the caprolactam monomer.

Potassium iodide which is water soluble, and water soluble copper compounds, such as copper acetate can be dissolved in water and impregnated into the polyepsiloncaprolactam. Alternately, potassium iodide and water soluble or insoluble copper compounds can be melt blended into the polyepsiloncaprolactam.

The copper compound is preferably melt blended with the polyepsiloncaprolactam at a temperature lower than about 282° C. (540° F.) and above the melting point of the polymer, preferably from 232° C. (450° F.) to 274° C. (525° F.). This is important to prevent any reaction which may occur between the copper compound and the polyepsiloncaprolactam from occurring during the melt blending. The polyepsiloncaprolactam and the copper compound, preferably cuprous iodide, are preferably melt blended in an extruder.

During the molding process, the composition is heated to from about 288° C. (550° F.) to about 399° C. (750° F.), and preferably from 302° C. (575° F.) to 352° C. (675° F.). If the temperature is too high optimum molding properties are not attained.

When cuprous compounds are used with unwashed polyepsiloncaprolactam, containing about 8 percent to about 12 percent caprolactam monomer, dark spots appear on the rotationally molded articles. The addition of potassium iodide eliminates the appearance of these dark spots. The potassium iodide also provides additional heat stabilization. It is, therefore, preferred to use potassium iodide in the composition and process of the present invention. Preferably, there is from about 0.001 percent to about 0.3 percent, and preferably about 0.01 percent to about 0.1 percent by weight of potassium iodide.

The rotational molding process with the above described composition comprises the steps of preparing a composition of the polyamide, the copper compound which is preferably cuprous iodide, and preferably potassium iodide. The composition is preferably in pellet form. This composition is fed into the rotational mold. The composition is heated within the mold as it is rotated. Generally, the rotational mold rotates simultaneously along two perpendicular axes. The mold is heated until the pellets within the mold melt and flow together on the inside surface of the mold. The mold is then cooled and the molded article is removed.

The polyamide composition for rotational molding can be fed into the mold in powder or pellet form. If the polyepsiloncaprolactam particles are too small, their surface area is so large that exposure to the atmosphere results in excessive moisture pickup. For example, a 35 mesh size polyepsiloncaprolactam powder exposed to the atmosphere is unsatisfactory unless it is kept dry. It is preferred to use pellets which are not as sensitive to moisture pickup. If the polyepsiloncaprolactam particles are too large, it takes a longer time for them to melt and thinner parts cannot be made. Pellets can be from about 1/32 by 1/32 inch (or about 1/32 inch average diameter) to about ⅛ by ⅛ inch (or about ⅛ inch average diameter). A preferred pellet shape is a cylindrical pellet from about 1/32 to 1/16 inch in diameter, by about 1/16 to ⅛ inch long.

The composition of the present invention can be processed in most commercial rotational molding machines. The temperatures range during the heating step from about 288° C. (550° F.) to about 399° C. (750° F.), and preferably from about 302° C. (575° F.) to about 352° C. (675° F.). If the temperature is too high during rotational molding, the impact properties deteriorate. The temperature must be high enough for the pellets to fuse together to form a smooth inner surface of the molded article. The mold is heated by suitable means known in the art. Generally, the mold rotates within a forced air circulating oven.

After the heating step the mold is cooled. The part must be cool enough to be easily removed from the mold and retain its shape. Preferably, the mold is removed from the oven while continuing to rotate. Cool air is first blown on the mold. The air can be at ambient temperature. After the air has started to cool the mold for a controlled time period, a water spray can be used. The water cools the mold more rapidly. The water used can be at cold water tap temperature, usually from about 4° C. (40° F.) to about 16° C. (60° F.). After the water cooling step, another air cooling step may optionally be used. This is usually a short step during which the equipment dries with heat removed during the evaporation of the water.

The heating and cooling cycle times will depend on the equipment used and the article molded. Specific factors include the part thickness and mold material. Typical conditions for a ⅛ inch thick part in a steel mold are to heat the part in an oven with air at about 343° C. (650° F.) for about 19 minutes. The part is cooled in ambient temperature forced air for about 5 minutes and then in a tap water spray at about 10° C. (50° F.) for about 5 minutes. Optionally, the part is cooled in ambient temperature forced air for an additional 2 minutes.

During the heating and cooling steps, the mold containing the molded article is continually rotated along two perpendicular axes. The rate of rotation of the mold about each axis is limited by machine capability and the shape of the article being molded. A typical range of operation which can be used with the present invention is to have a ratio of rotation of the major axis to the minor axis of from 1:2 to 1:10, and 2:1 to 10:1.

Preferably, the rotational molding is conducted under an inert atmosphere within the mold. However, this is not necessary, although it is preferred when using the preferred composition containing polyepsiloncaprolactam having an excess of chain ends terminated by a dicarboxylic acid group. When it is desired to use an inert atmosphere, the mold cavity can be purged with nitrogen. Most rotational molding machines have arms which are drilled for gas injection, so that all that is necessary is to connect a nitrogen gas cylinder to the arm, using the rotary valves in the connection. Alternatively, dry ice can be added to the mold cavity at the time the resin is charged to the mold. The dry ice will sublime during the heating cycle and provide an inert atmosphere.

The mold surface can be sprayed or coated with a mold release coating. A preferred mold release agent is a baked-on silicon based mold release coating, such as Freekote ®. This coating is baked for 15-20 minutes at about 282° C. (450° F.) to 343° C. (550° F.). The mold is cooled and sanded on the inside. The sanded surface allows the composition to maintain contact during molding and not release to readily and warp while being cooled. Yet upon cooling, the molded article easily releases. A vent can be used to avoid pressure buildup on the inside of the mold during the heating step.

In summary, the mold is charged with a preweighed amount of the composition. The mold is closed and clamped securely to be sure that there is an adequate mating of the mold at the parting line. Preferably, an inert gas such as nitrogen is fed into the mold. The mold biaxially rotates as the molding begins and continues through the heating and cooling steps.

Several examples are set forth below to illustrate the nature of the invention and the manner of carrying it out. However, the invention should not be considered as being limited to the details thereof. All parts are percent by weight unless otherwise indicated. The physical test results were obtained using the following procedures: drop weight impact—ASTM D-3029 with a 3 inch specimen support; tensile strength at yield, and elongation at break—ASTM D-638; flexural strength and flexural modulus—ASTM D-790; notched Izod impact strength—ASTM D-256; and heat deflection temperature—ASTM D-648. For comparison purposes, in considering the drop weight impact values, the drop weight impact of a rotationally molded sample of polyepsiloncaprolactam containing no copper or potassium cations is about 20 ft. lbs. to about 40 ft. lbs.

EXAMPLES 1-6

The polyamide used in Examples 1-6, which follow, is polyepsiloncaprolactam having more chain ends terminated with azelaic acid than amine groups. The polyepsiloncaprolactam has about 45 milli equivalent (m.eg.) of carboxyl and about 20 m.eg. amine terminated end groups per kilogram (kg) of polyepsiloncaprolactam. The polyepsiloncaprolactam has an estimated formic acid relative viscosity of from about 60 to about 80. The polyepsiloncaprolactam was washed in water to remove unreacted caprolactam monomer. About 1.5 percent caprolactam remains. The polyepsiloncaprolactam was impregnated in the water bath with cupric acetate monohydrate and potassium iodide so that there is 0.0025 weight percent of cupric ion in the form of cupric acetate and 0.07 weight percent potassium iodide.

EXAMPLE 1

A cuprous iodide concentrate or masterbatch useful in preparing the polyepsiloncaprolactam composition of the present invention was prepared. The composition was made using 98.1 percent by weight polyepsiloncaprolactam having an excess of chain ends terminated with carboxyl groups rather than amine groups. 1.8 percent of cuprous iodide and 0.1 percent of Nujol ™, mineral oil were used. The polyepsiloncaprolactam was charged to a tumbler and the Nujol added. After 2 minutes, the cuprous iodide was added and the material blended for 10 additional minutes. The material had an estimated formic acid viscosity of 60 to 80.

EXAMPLE 2

A compostion of the present invention was made using the masterbatch of Example 1. The composition contained 99 percent polyepsiloncaprolactam having an excess of chain ends terminated with carboxyl groups rather than amine groups. There was 1 percent by weight of cuprous iodide masterbatch of Example 1 or 0.018 percent by weight cuprous iodide. The ingredients were physically blended and then extruded in a 4½ inch barrel diameter single screw Sterling extruder using a 20 hole by ⅛ inch die, and a 200 mesh screen pack. The temperature in the extruder did not exceed 285° C. Nitrogen was used to blanket the throat of the extruder. The formic acid relative viscosity was estimated to be 60 to 80. There were no more than 2 percent extractables and pellets were made 1/16 inch in diameter by ⅛ inch long. The pellets were dried to less than 0.10 percent moisture. Test specimens were satisfactorily rotationally molded from this material.

EXAMPLE 3

A composition was made of 99.99 percent by weight polyepsiloncaprolactam resin having an excess of chain ends terminated with carboxyl groups over chain ends terminated by amine groups, and combined with 0.011 weight percent cuprous iodide. The ingredients were blended for 15 minutes in a tumbler. They were extruded in a 3½ diameter single screw Hartig extruder using a 20 hole by ⅛ inch die, 50 mesh screen pack. Zone 1 was at 305° C.; zone 2 was at 280° C.; zone 3 was at 260° C.; and the die was at 250° C. The screw rotated at 60 rpm. The material had a formic acid relative viscosity of 65 to 73 and 0.15 percent moisture. There were no more than 2 percent extractables and the pellet size was ⅛ inch long by 1/16 inch in diameter. Test specimens were satisfactorily rotationally molded from this material.

EXAMPLE 4

The following properties are typical for a dry as molded specimen cut from rotational molded parts using the composition of Example 2. The parts were molded for 19 minutes at 343° C. (650° F.) to a thickness of ⅛ inch. The cooling cycle was for 5 minutes in forced ambient air, 5 minutes in cold tap water and finally, 2 minutes in forced ambient air. They were molded with the inside of the mold continuously purged with nitrogen.

TABLE I

| Properties | | Values |
|---|---|---|
| Melting Point (°F.) | | 420 |
| Specific Gravity | | 1.13 |
| Water Absorption, 24 hrs., % | | 1.3 |
| Coefficient of Linear Thermal Expansion, in./in./°F. | | $4.1 \times 10^{-5}$ |
| Rockwell Hardness (R scale) | | 116 |
| Tensile Strength at Yield, psi | 21° C. (70° F.) | 10500 |
| Elongation at Break, % | 21° C. | 20 |
| Flexural Strength, psi | 21° C. | 14500 |
| Flexural Modulus, psi | 21° C. | 380,000 |
| Izod Impact Str., notched, ft. lbs./in. notch | 21° C. | 0.9 |
| Drop Weight Impact ft. lbs. | 21° C. | 70-120 |

TABLE I-continued

| Properties | | Values |
|---|---|---|
| Heat Deflection Temp. °F. @ | 66 psi | 350 |
| | 264 psi | 145 |

EXAMPLE 5

This example illustrates the use of the polyepsiloncaprolactam plus cuprous iodide composition of Example 2 used in the rotational molding of a 16-gallon tank. In this case, the major axis was rotated at 6 rpm and the ratio of rotation of the major axis to the minor axis was 4:1. The composition contained 99.98 percent polyepsiloncaprolactam and 0.018 percent cuprous iodide. A nitrogen atmosphere was used. The 16-gallon tank produced had a satisfactory appearance and satisfactory physical properties including impact properties, as summarized in Table II below.

EXAMPLE 6

A 160-gallon tank having the dimensions and properties summarized in Table II below was rotationally molded using the composition of Example 2. The process conditions used are noted and the rotation of the major axis was 6 rpm with the ratio of the rotation of the major to minor axes being 4:1. In this process, a nitrogen atmosphere was used. The tank had satisfactory physical properties including impact properties, and satisfactory appearance.

TABLE II

| | Ex. 5 | Ex. 6 |
|---|---|---|
| Tank Size Gals. | 16 | 160 |
| Part. Thickness, in. | 0.150 | 0.250 |
| Part. Dimensions, in | 25 × 25 × 10 | 60 × 60 × 18 |
| Part. Weight, lbs. | 14 | 150 |
| MOLDING CONDITIONS | | |
| Oven Temperature, °F. | 650 | 650 |
| Heating Cycle, min. | 17 | 28 |
| Cooling Cycle, min. | | |
| Air | 5 | 5 |
| Water | 3 | 8 |
| Air | 2 | 2 |
| Rotation - Major, rpm | 6 | 6 |
| - Ratio | 4:1 | 4:1 |
| Inert Atmosphere | Yes | Yes |

In Examples 7-25 which follow, the compositions were blended and pelletized using a laboratory size 2½ inch diameter NRM single screw extruder. Cubes 16 inches on each side having a ⅛ inch wall thickness were rotationally molded in the laboratory to judge appearance and test physical properties. Generally, impact testing of moldings from this laboratory extruder has been found to be somewhat erratic compared to the results when using manufacturing size equipment of the type used in Examples 1-6. The variability is believed to be caused by the higher degree of mixing obtained when using manufacturing versus laboratory size extruders.

EXAMPLES 7-8

Examples 7 and 8 summarized in Table III below were conducted with polyepsiloncaprolactam of the type used in Examples 1-6, containing 0.011 percent cuprous iodide. This brought the total amount of copper to about 60 parts per million, and there were 700 parts per million potassium iodide. In Example 8, 8 percent by weight of caprolactam monomer was added as a plasticizer. The samples were rotationally molded in a $CO_2$ atmosphere at the summarized conditions. The samples were ⅛ inch thick and had satisfactory appearance. Times are in minutes.

TABLE III

|  | ADDED CAPRO. | ADDED $Cu_2I_2$ | OVEN T °C. | OVEN TIME | AIR COOL TIME | WATER COOL TIME | DROP WT. IMPACT FT. LBS. |
|---|---|---|---|---|---|---|---|
| Ex. 7 | 0 | 0.011% | 343 | 19 | 5 | 5 | 92 |
| Ex. 8 | 8 | 0.011% | 343 | 19 | 5 | 5 | 92 |

These results indicate that the use of cuprous iodide with the potassium iodide results in a composition which has satisfactory appearance and excellent impact properties both with and without added caprolactam plasticizer. In the past, rotationally molded polyamide preferably contained a plasticizer, such as the monomer, to maintain higher impact properties. This is not necessary with the composition of the present invention. However, a plasticizer can be used if desirable to improve the flexibility of the molded article.

EXAMPLES 9-13

Samples were prepared from polyepsiloncaprolactam of the type used in Examples 1-6 and containing 0.018 percent cuprous iodide melt blended, at a variety of extrusion conditions. The extrusion melt temperatures were varied and different size screen packs were used. A screen pack is a screen located behind the die. The screen is supported by a breaker plate which has a plurality of larger holes to break up the material coming from the screw. The screen increases the back pressure in the extruder and results in more thorough mixing. The compositions were extruded to form cylindrical pellets 1/16 inch in diameter by ⅛ inch long. The pellets were rotationally molded to form 16 inch cubes ⅛ inch thick. Samples from these cubes were tested for drop weight impact. The cubes were rotationally molded in a $CO_2$ atmosphere for 19 minutes at 343° C. (650° F.). The mold is then cooled in forced ambient air for 5 minutes, in a water spray at cold water tap temperature for 5 minutes, and in forced ambient air cooled for 2 minutes. The water used was at the temperature of the cold water supply to the laboratory, about 10° (50° F.). The mold rotated along two axes simultaneously with a rotation ratio of 4 to 1 from one axis to the other. The major axis of rotation was at about 6 revolutions per minute. The extrusion temperature, screen size, drop weight impact value and failure mode are summarized in Table IV below:

TABLE IV

| Example | Extr. Melt Temp. °C. | (°F.) | Screen Size (Mesh Size) | Drop Wt. Impact ft-lbs. | Number Shatter Failures | Number Ductile Failures |
|---|---|---|---|---|---|---|
| 9 | 232 | (450) | 200 | 103 | 5 | 3 |
| 10 | 260 | (500) | 200 | 120 | 5 | 5 |
| 11 | 302 | (575) | 200 | 30 | 14 | 0 |
| 12 | 260 | (500) | 200 | 103 | 3 | 6 |
| 13 | 260 | (500) | 50 | 54 | 11 | 0 |

These results indicate that when melt blending the cuprous iodide into the polyepsiloncaprolactam, a temperature in the extruder of 302° C. results in decreased impact values. Additionally, Examples 12 and 13 indicate that the increased back pressure by use of a 200 mesh screen rather than a 50 mesh screen improved the impact resistance. It is noted that ductile type failure is preferred to a shatter-type failure. The ductile failure is more local puncture, while a shatter results in cracking over a larger area. The use of a lower extruder temperature and the use of a finer screen both result in improved impact resistance.

EXAMPLES 14-18

Table V below summarizes a study to determine the importance of potassium iodide to the appearance of a rotationally molded article. Compositions of unwashed polyepsiloncaprolactam were used. The unwashed polyepsiloncaprolactam contained about 10 percent of a caprolactam monomer and no copper or potassium cations other than those indicated in Table IV. An article having good appearance has a uniform, light natural white color. Articles having bad appearance had dark specks. The samples were prepared in the same manner as those in Examples 9-13. The cupric acetate was added as cupric acetate monohydrate. The potassium iodide was added in crystal form, and also in powder form mixed with one percent Cab-O-Sil TM, a colloidal pyrogenic silica, to improve its flow. The amounts of material used are in grams.

TABLE V

|  | Ex. 14 | Ex. 15 | Ex. 16 | Ex. 17 | Ex. 18 |
|---|---|---|---|---|---|
| Polyepcapr. (10% capr) | 5928 | 5939 | 5922 | 5922 | 5933 |
| $Cu_2I_2$ | 72 | 60 | 72 | 72 | 60 |
| Cu $(C_2H_3O_2)_2.H_2O$ | — | .47 | — | — | .47 |
| KI (crystal) | — | — | — | 6 | 6 |
| KI(1% + Cab-O-Sil) | — | — | 6 | — | — |
| Appearance | specks | specks | good | good | good |

EXAMPLES 19-25

Table VI below summarizes a study of the appearance of various formulations. In Examples 19-25 unwashed polyepsiloncaprolactam was used which contained no copper or potassium compounds other than that shown. The unwashed polyepsiloncaprolactam contained about 10 percent by weight of caprolactam monomer. In Examples 24 and 25 the polyepsiloncaprolactam used was of the type used in Examples 1-6 containing only about 1.5 percent by weight of caprolactam and about 0.07 percent by weight of potassium iodide and about 0.0025 percent by weight of cupric acetate monohydrate ($Cu(C_2H_3O_2)_2.H_2O$). The samples in Examples 19-25 were prepared in the same manner as those in Examples 9-13. The amounts of each material are in grams.

TABLE VI

|  | Ex. 19 | Ex. 20 | Ex. 21 | Ex. 22 | Ex. 23 | Ex. 24 | Ex. 25 |
|---|---|---|---|---|---|---|---|
| Polyep. capr[1] | 10000 | 9880 | 9889 | 9930 | 9997 |  |  |
| Polyep. capr[2] |  |  |  |  |  | 9900 | 9200 |

TABLE VI-continued

|  | Ex. 19 | Ex. 20 | Ex. 21 | Ex. 22 | Ex. 23 | Ex. 24 | Ex. 25 |
|---|---|---|---|---|---|---|---|
| $Cu_2I_2$ |  | 120 | 100 |  |  | 120 | 100 |
| $CuCl_2$ |  |  |  | 70 |  |  |  |
| $Cu(C_2H_3O_2)_2 \cdot H_2O$ |  |  | .79 |  | 2.67 |  |  |
| Caprolactam |  |  |  |  |  |  | 700 |
| KI (1% Cab-O-Sil) |  |  | 10 |  |  |  |  |
| Appearance | Good | Specks | Good | Good | Purple | Good | Good |

[1] Polyepsiloncaprolactam with 10 percent caprolactam monomer.
[2] Polyepsiloncaprolactam with 1.5 percent caprolactam monomer, 0.0025 percent $Cu(C_2H_3O_2)_2 \cdot H_2O$, and 0.07 percent potassium iodide.

Examples 14 through 25 indicate that unwashed polyepsiloncaprolactam, which contains about 10 percent caprolactam monomer, requires potassium iodide for a good appearance when using cuprous iodide. The use of the cupric acetate alone resulted in a purple colored molding.

While exemplary embodiments of the invention have been described, the true scope of the invention is to be determined from the following claims:

What is claimed is:

1. A method of rotationally molding a polyamide article in a rotationally molding mold comprising rotationally molding a polyamide composition in the presence of oxygen wherein the composition comprises a polyamide having from 60 percent to 90 percent of the polyamide chain ends terminated with acid groups, and from about 0.001 percent to about 0.5 percent, by weight of the polyamide, of a copper compound.

2. The method as claimed in claim 1 further comprising melt blending the polyamide composition at a temperature higher than the melt temperature of the polyamide and less than about 282° C. (540° F.).

3. The method as recited in claim 2 wherein the step of rotationally molding further comprises:
feeding the polyamide composition to the cavity of the rotational mold, wherein the composition comprises a polyamide and from about 0.01 percent to about 0.5 percent, by weight of the polyamide, of a copper compound;
rotating the mold simultaneously around two perpendicular axes; heating the composition within the mold; cooling the mold; and removing the molded article.

4. The method as recited in claim 2 the preparation of the polyamide composition by the further steps of:
physically mixing the polyamide composition and the copper compound prior to melt blending.

5. The method as recited in claim 1 wherein the copper compound is cuprous iodide.

6. The method as recited in claim 1 wherein the composition further comprises potassium iodide.

7. The method as recited in claim 1 wherein the polyamide has from 60 to 80 percent of the chain ends terminated with acid groups.

8. The method as recited in claim 1 wherein the polyamide is polyepsiloncaprolactam.

9. The method as recited in claim 8 wherein the polyamide has from 60 to 80 percent of the chain ends terminated with acid groups.

10. The method as recited in claim 8 wherein the composition further comprises about 8 percent to about 12 percent caprolactam monomer.

11. The method as recited in claim 2 wherein the polyamide is melt blended at a temperature higher than the melt temperature of the polyamide and less than about 500° F.

12. The method as recited in claim 1 wherein the composition is rotationally molded in the presence of air.

* * * * *